(12) United States Patent
Curran et al.

(10) Patent No.: US 6,382,191 B1
(45) Date of Patent: May 7, 2002

(54) FUEL TANK PRESSURE CONTROL SYSTEM

(75) Inventors: Patrick Joseph Curran, Northville; Douglas Joseph Mancini, Farmington; David Chester Waskiewicz, Hamburg; Jae Doo Chung, Westland, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/637,941

(22) Filed: Aug. 12, 2000

(51) Int. Cl.⁷ .............................................. F02M 33/02
(52) U.S. Cl. ...................................... 123/518; 123/520
(58) Field of Search ................................ 123/516, 518, 123/519, 520, 198 D

(56) References Cited

U.S. PATENT DOCUMENTS

| | | |
|---|---|---|
| 4,862,856 A | 9/1989 | Yokoe et al. |
| 5,021,071 A | 6/1991 | Reddy |
| 5,048,492 A | 9/1991 | Davenport et al. |
| 5,148,793 A | 9/1992 | Reddy |
| 5,197,442 A | 3/1993 | Blumenstock et al. |
| 5,275,145 A | 1/1994 | Tuckey |
| 5,280,775 A | 1/1994 | Tanamura et al. |
| 5,357,934 A | 10/1994 | Iida et al. |
| 5,363,828 A | 11/1994 | Yamashita et al. |
| 5,450,834 A | 9/1995 | Yamanaka et al. |
| 5,479,905 A * | 1/1996 | Ito ................................ 123/520 |
| 5,488,936 A | 2/1996 | Rychlick et al. |
| 5,524,595 A * | 6/1996 | Ito ................................ 123/520 |
| 5,584,278 A | 12/1996 | Satoh et al. |
| 5,614,665 A | 3/1997 | Curran et al. |
| 5,647,333 A | 7/1997 | Mukai |
| 5,750,888 A | 5/1998 | Matsumoto et al. |
| 5,960,817 A | 10/1999 | Johansen et al. |
| 5,970,957 A | 10/1999 | Fried et al. |
| RE36,600 E * | 3/2000 | Ito ................................ 123/520 |
| 6,041,761 A | 3/2000 | Uto et al. |

* cited by examiner

Primary Examiner—Willis R. Wolfe
Assistant Examiner—Mahmoud Gimie
(74) Attorney, Agent, or Firm—Julia Voutyras; John D. Russell

(57) ABSTRACT

A method is presented for controlling fuel tank pressure in an internal combustion engine. The engine, the fuel tank and the carbon canister are connected in a three-way connection. The engine can be selectively isolated by a purge control valve, and the fuel tank can be selectively isolated by a fuel tank control valve. The operation of both valves is coordinated by an electronic engine controller. By isolating the fuel tank during the carbon canister purge, vapor spikes into the engine are eliminated, thus preventing engine stalls. Also, canister durability is improved by continuously storing and purging vapors in opposite directions.

45 Claims, 4 Drawing Sheets

FUEL TANK PRESSURE CONTROL SYSTEM

FIELD OF THE INVENTION

The invention relates to a system and method for controlling fuel vapor purging in a vehicle equipped with an internal combustion engine coupled to a fuel tank coupled to a purging canister.

BACKGROUND OF THE INVENTION

Vehicles typically have various devices installed for preventing and controlling emissions. One of the sources of emissions are fuel vapors generated in the fuel tank due to temperature cycling and fuel vapors that are displaced in the process of refueling the fuel tank. In order to remove these vapors from the fuel tank, vehicles are equipped with fuel emission control systems, typically including a fuel vapor storage device, which in this example is an activated charcoal filled canister for absorbing the evaporative emissions. One such system is described in U.S. Pat. No. 5,280,775. The canister is connected in series between the fuel tank and the engine. Vapors generated in the fuel tank are drawn into the canister where the fuel component (usually hydrocarbons) is absorbed on the carbon granules and the air is expelled into the atmosphere. A solenoid controlled, constant pressure operating valve is fitted in a passage between the canister and the fuel tank to selectively enable and disable communications. Also, a purge control valve is located in the passage between the engine and the canister. During canister purge, the valve opens, allowing manifold vacuum from the engine to draw air from the atmosphere back into the canister, thus purging the fuel vapors into the engine, where they are burned.

Other conventional systems have a three-way connection between the fuel tank, the canister, and the engine as described in U.S. Pat. No. 5,048,492. The engine is connected to the fuel tank and the carbon canister via a communication passage. A purge control valve is located in the intake manifold of the engine. A controller selectively opens and closes the purge control valve to allow purged fuel vapors to enter the engine.

The inventors herein have recognized a disadvantage with the above approaches. Namely, with the first system, the vapors are always pushed through the canister in one direction, in at one end and out at the other, which means that sediments do not get removed from it by opposing airflow. In other words, pushing the vapors in only one direction may prematurely degrade the canister and reduce the durability of the canister. With the second system, there is a risk of rich or lean spikes or air and fuel vapors inducted into the engine during canister purging since the tank is not isolated. These vapor transients can cause vehicle stalls or degrade emission control. Another disadvantage is that under certain conditions, with the vapors from the fuel tank always entering the canister, the rate of fuel vapor generation may become greater than the rate of purge into the engine. Consequently, the carbon canister may become saturated and the fuel purge may take a long time to complete. This disadvantage is exacerbated in vehicles with direct ignition spark injection (DISI) and hybrid electric vehicle (HEV) engines. In DISI engines fuel is sprayed directly into the engine cylinder, and they frequently operate with low or no vacuum. An HEV engine is typically an electric motor coupled to a conventional internal combustion engine that is periodically turned on and off. In both DISI and HEV engines, the fuel vapor purge cycle is much shorter than in conventional engines. However, with the second system, a large amount of purge time is required due to the fact that the fuel tank is not isolated and vapors are always being generated, thereby limiting potential fuel economy benefits.

SUMMARY OF THE INVENTION

An object of the present invention is to provide a system for improved control of fuel vapor purging in to an internal combustion engine.

The above object is achieved and disadvantages of prior approaches overcome by a system for controlling fuel vapor purging in a vehicle consisting of: an internal combustion engine; a fuel tank; a fuel vapor storage device; and a valve assembly routing fuel vapors in a first direction only from said fuel tank to said fuel vapor storage device and for routing fuel vapors in a second direction opposite said first direction into said engine only from said fuel vapor storage device.

An advantage of the above aspect of the invention is that the proposed system configuration allows isolating the fuel tank during canister purging. This eliminates fuel vapor transients from the tank to the engine. With the tank isolated, vehicle stalls or emission control degradation can be minimized. Also, this system achieves the benefits of in-series canister buffering without the durability problems associated with prior approaches. In addition, by allowing the canister to be filled in one direction and purged in the opposite direction, the time required to purge fuel from the canister can be reduced by not requiring fuel vapor to be drawn through all the canister's active carbon. Another advantage is with the proposed configuration purge time will be reduced due to the fact that that fuel tank vapors will not continuously be entering the canister.

Other objects, features and advantages of the present invention will be readily appreciated by the reader of this specification.

BRIEF DESCRIPTION OF THE DRAWINGS

The object and advantages claimed herein will be more readily understood by reading an example of an embodiment in which the invention is used to advantage with reference to the following drawings herein:

DESCRIPTION OF THE INVENTION

Figure 1:
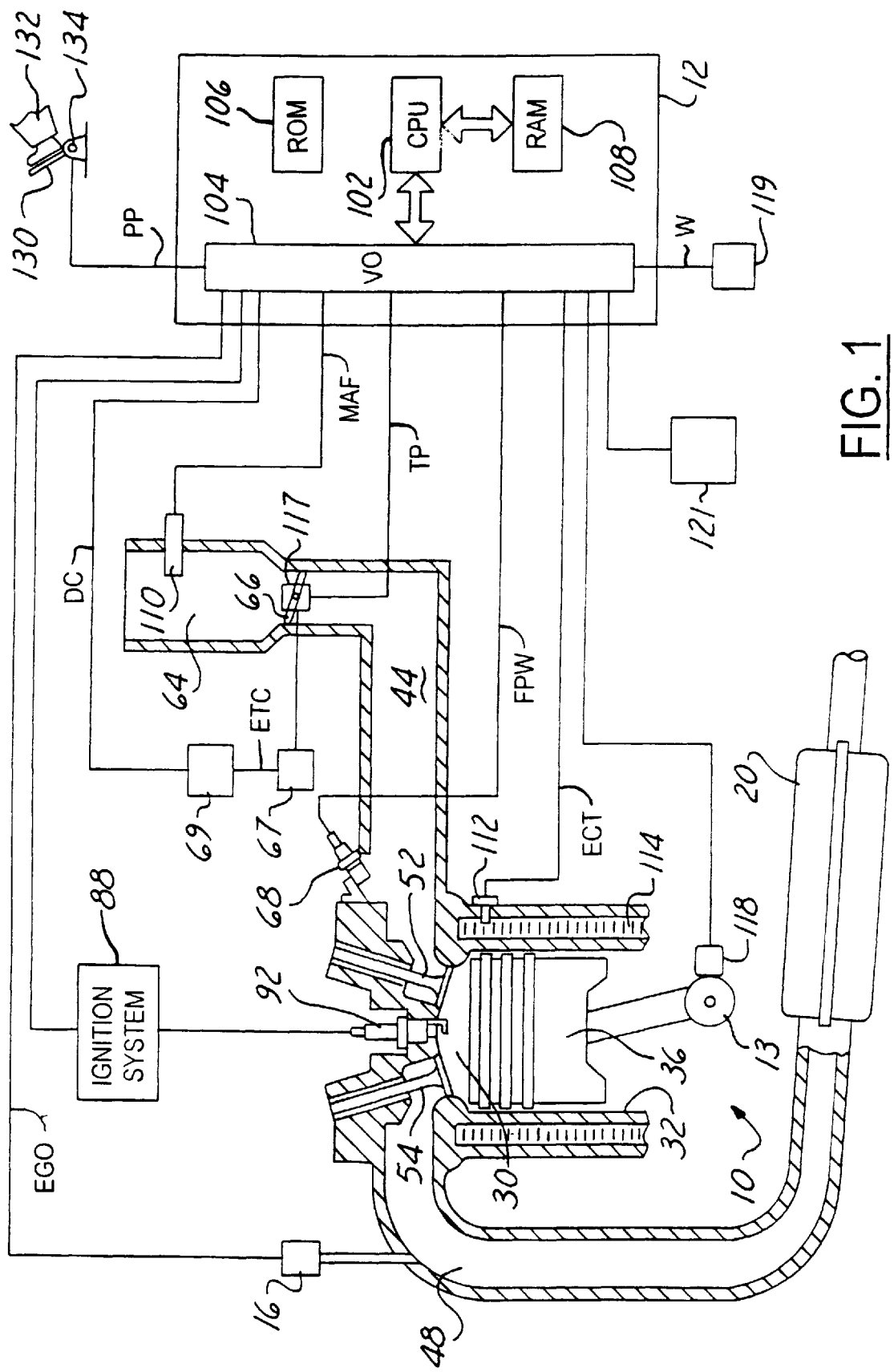
FIG. 1 is a block diagram of an engine in which the invention is used to advantage.

Internal combustion engine 10 having a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20. In a preferred embodiment, sensor 16 is a HEGO sensor as is known to those skilled in the art.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of throttle position (TP) from throttle position sensor 117 coupled to throttle plate 66; a measurement of transmission shaft torque, or engine shaft torque from torque sensor 121, a measurement of turbine speed (Wt) from turbine speed sensor 119, where turbine speed measures the speed of shaft 17, and a profile ignition pickup signal (PIP) from Hall effect sensor 118 coupled to crankshaft 13 indicating an engine speed (We). Alternatively, turbine speed may be determined from vehicle speed and gear ratio.

Continuing with FIG. 1, accelerator pedal 130 is shown communicating with the driver's foot 132. Accelerator pedal position (PP) is measured by pedal position sensor 134 and sent to controller 12.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

Figure 2:
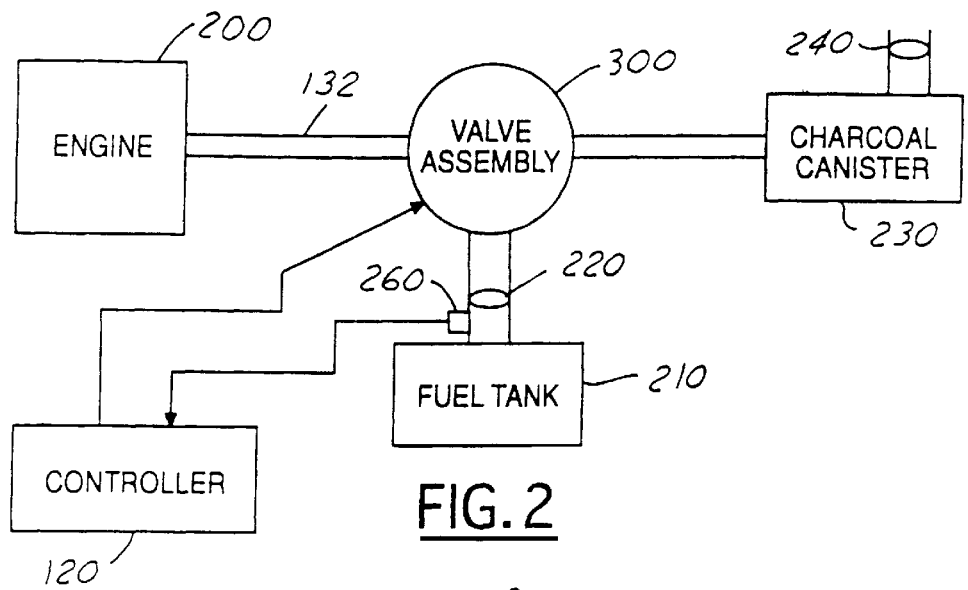
FIG. 2 is a block diagram of an embodiment wherein the invention is used to advantage.

Referring next to FIG. 2, the proposed fuel purge system components are described in detail. Engine 200, which could be a conventional, DISI, HEV or a diesel engine, is connected to fuel tank 210 and charcoal canister 230 via communication passage 132. A gravity valve 220 is used to seal off the tank vent line. Tank pressure sensor 260 provides fuel tank pressure information to controller 12. Charcoal canister 230 is used to store fuel vapors. Intake of outside air into the canister is controlled by canister vent valve 240. Valve assembly 300 is located at the intersection of fuel vapor supply lines from the fuel tank, the engine and the carbon canister. As the pressure inside the fuel tank 210 changes due to fuel vapor generation, the controller 12 receives tank pressure information from pressure sensor 260. When the internal pressure of the tank exceeds a predetermined value, the controller 12 sends signals to the valve assembly 300 to enable fuel vapor storage in the canister, where charcoal granules absorb and retain fuel vapors, while the fresh air component of the vapors is expelled into the atmosphere via canister vent valve 240. When controller 12 determines that conditions for canister purge (e.g., the end of engine adaptive learning cycle, ambient temperature, barometric pressure, etc.) are met, it sends a signal to the valve assembly to enable fuel vapor purge from canister to engine. Valve assembly preferably couples engine to canister only during purging and fuel tank to canister only otherwise to store fuel vapors.

Figure 3:
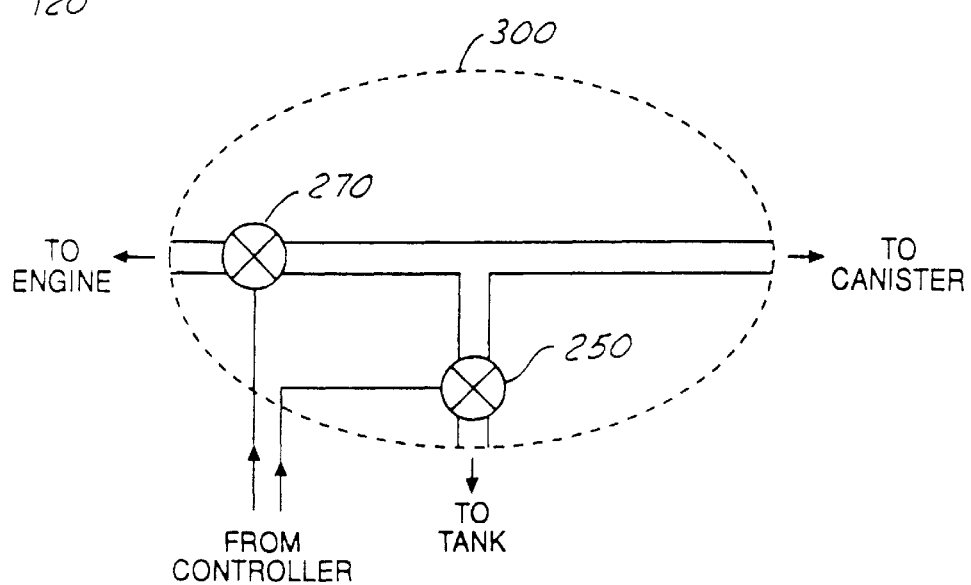
FIG. 3 is an example valve assembly.

Referring now to FIG. 3, an example of the valve assembly components is described in detail. A purge control valve 270 is located on the engine side of the fuel vapor purge control system, and is selectively turned on and off by controller 12. Alternatively, the purge control valve may be continuously controlled thus varying the opening area of the communication passage 132. Tank control valve 250 is used to isolate the fuel tank and is selectively turned on and off by controller 12. When the internal pressure of the tank exceeds a predetermined value, the controller 12 sends signals to close purge control valve 270 and open tank control valve 250 in order to store fuel vapors in the carbon canister. In addition, when canister purge needs to be performed, controller 12 sends a signal to open purge control valve 270 and close tank control 250 thus isolating the fuel tank. With the purge control valve 270 open, intake manifold vacuum draws fresh air from the atmosphere into the charcoal canister, thus purging the vapors from the canister into the engine where they are burned with fresh air. Alternatively, the opening area of the purge control valve 270 can be controlled by controller 12 in response to desired purge flow. Fuel vapors during canister purge into the engine flow in the direction opposite to fuel vapor flow during fuel vapor storage from the fuel tank into the canister.

The example described above is but one exemplary system that can be used. Those skilled in the art will recognize, in view of this disclosure that various other assemblies may be used. For example, a three-way valve could be used in place of the two valves described above. According to the present invention, valve assembly 300 could preferably be any valve assembly that provides the structure of coupling the fuel tank to the canister only, and coupling the engine to the canister only.

Figure 4:
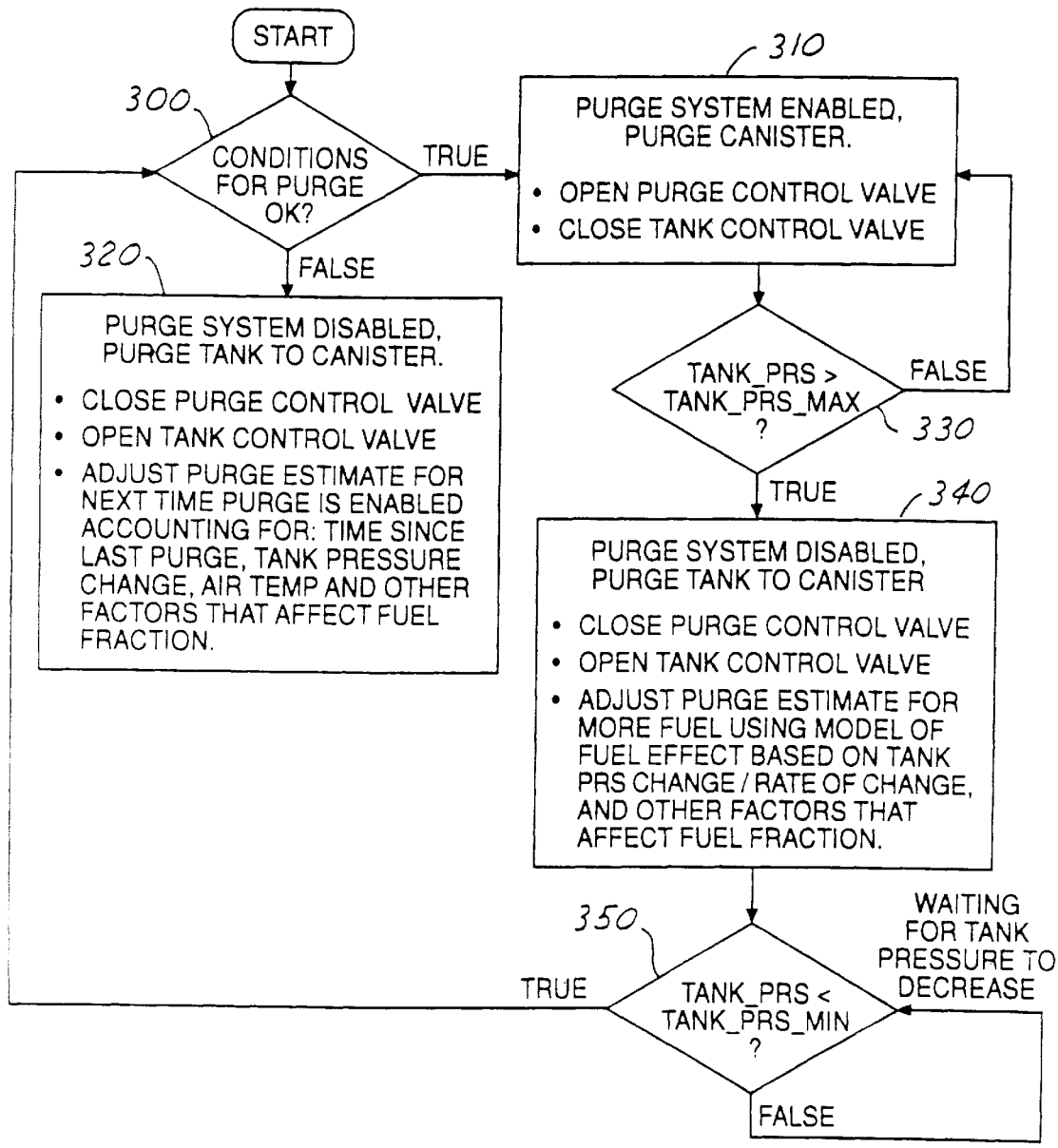
FIG. 4 is a high level flowchart illustrating various program steps performed by a portion of the components illustrated in FIG. 3.

Referring now to FIG. 4, a routine is described for controlling the fuel purge system in the example embodiment. First, in step 300 a determination is made whether the conditions for canister purge are met (e.g., the end of engine adaptive learning cycle, ambient temperature, barometric pressure, etc.). If the answer to step 300 is NO, the routine moves to step 320 where the vapors from the fuel tank are purged to the canister. This is accomplished by closing the purge control valve and opening the tank control valve. Also, purge fuel fraction estimate is adjusted for the next time purge is enabled. This estimate is a function of some or all of the following inputs: ambient temperature, barometric pressure, maximum and minimum tank pressure, time since last purge, time since tank control valve closed, last adapted fraction of fuel coming from the purge canister, tank vapor temperature, tank bulk fuel temperature, and vapor canister temperature. If the answer to step 300 is YES, the routine proceeds to step 310, where the purge system is enabled, and the contents of the canister are purged to the engine. This is accomplished by opening the purge control valve and closing the tank control valve. The routine then proceeds to step 330 whereupon a determination is made whether the internal pressure of the fuel tank, $TANK_{13}\ PRS$ is greater than a predetermined constant, $TANK_{13}\ PRS\_MAX$. If the answer to step 330 is NO, the routine returns to step 310, and canister purge continues. If the answer to step 330 is YES, the routine proceeds to step 340, whereupon purge control valve is closed and tank control valve is opened in order to purge the fuel tank to the canister. Also, purge estimate is adjusted for more fuel based on some or all of the following inputs: ambient temperature, barometric pressure, maximum and minimum tank pressure, time since last purge, time since tank control valve closed, last adapted fraction of fuel coming from the purge canister, tank vapor temperature, tank bulk fuel temperature, and canister vapor temperature. The routine then proceeds to step 350 where a determination is made whether the internal pressure of the fuel tank is less than a preselected value, TANK_PRS_MIN. If the answer to step 350 is YES, the routine returns to step 300 and monitoring continues. If the answer to step 350 is NO, the routine remains in step 350, waiting for the fuel tank pressure to decrease.

Figure 5:
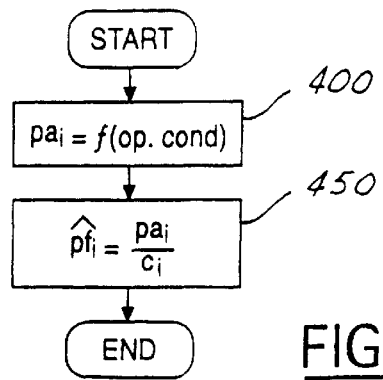
FIGS. 5 and 6 are high level flowcharts illustrating an example of a strategy for learning and adjusting estimates of the fuel fraction as required by FIG. 4.

Next, in FIG. 5, an algorithm for predicting fuel flow through the purge control valve is described. First, in step 400, air flow through the purge control valve, $pa_i$, is calculated as a function of operating conditions, such as valve position, manifold pressure, ambient temperature, barometric pressure, etc. Next, in step 450, predicted fuel flow through the purge control valve, $\hat{p}f_i$, is calculated according to the following formula:

$$\hat{p}f_i = \frac{pa_i}{c_i},$$

where $c_i$ is the learned value of the fuel fraction in the purge vapors which is calculated as described later herein with particular reference to FIG. 6.

Figure 6:
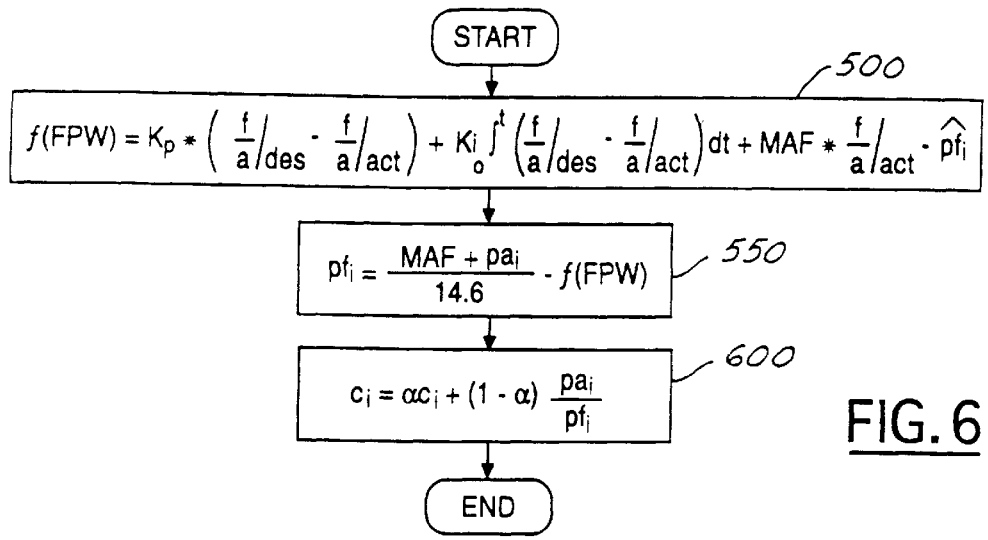

Referring now to FIG. 6, an algorithm is described for learning the fuel fraction entering the engine during the canister purge. First, in step 500 fuel flow as a function of fuel pulse width is calculated according to the following formula using a PI controller with a feed forward correction term:

$$f(FPW) = k_p \cdot \left(\frac{f}{a}\bigg|_{des} - \frac{f}{a}\bigg|_{act}\right) + k_i \cdot \int_0^t \left(\frac{f}{a}\bigg|_{des} - \frac{f}{a}\bigg|_{act}\right) dt + MAF \cdot \frac{f}{a}\bigg|_{des} - \hat{p}f_i$$

Next, in step 550 fuel flow through the purge control valve is calculated assuming stoichiometry:

$$pf_i = \frac{MAF + pa_i}{14.6} - f(FPW)$$

where $pf_i$ is the fuel flow through the valve, $pa_i$ is the air flow through the purge valve value obtained in step 400 of FIG. 5, MAF is manifold air flow, and f(FPW) is fuel flow as a function of fuel pulse width. Next, the learned value of the fuel fraction in the purge vapors, $c_i$, is updated in step 600 according to the following formula:

$$c_i = \alpha \cdot c_i + (1-\alpha) \cdot \frac{pa_i}{pf_i}$$

Figure 7:
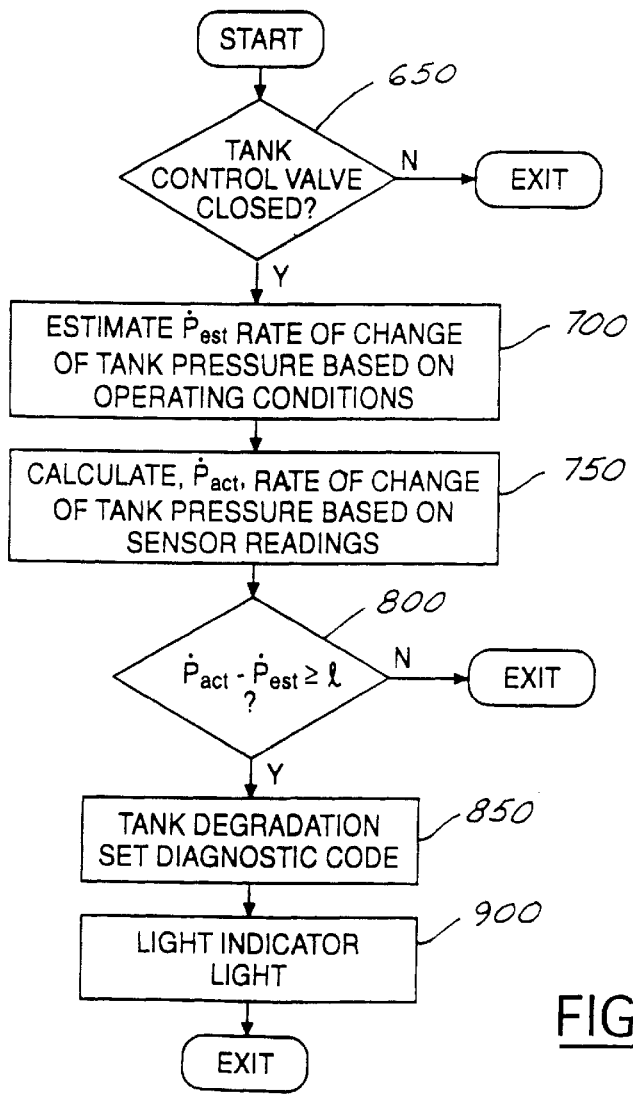
FIG. 7 is a high level flowchart illustrating and example of a strategy for diagnosing a condition in the fuel tank.

Referring now to FIG. 7, a routine is described for diagnosing conditions in the fuel vapor purge system. First, in step 650 a determination is made whether the tank control valve is closed, i.e., the tank is isolated. If the answer to step 650 is NO, the diagnostic routine is exited. If the answer to step 650 is YES, the routine moves on to step 700 where $\dot{P}_{est}$, the estimated rate of change of internal fuel tank pressure is calculated based on operating conditions, such as ambient temperature, barometric pressure, bulk fuel temperature, etc. The routine then proceeds to step 750 where $\dot{P}_{act}$, the actual rate of change of the internal pressure of the fuel tank is calculated based on the information from the fuel tank pressure sensor. Next, in step 800 a determination is made whether the actual rate of change exceeds the estimated rate of change by the amount greater than or equal to a small, preselected constant, L. If the answer to step 800 is NO, there is no condition in the fuel tank, and the routine is exited. If the answer to step 800 is YES, and there is a difference between the actual and calculated rates of change of fuel tank pressure, a determination is made that there is a condition in the fuel tank, and a diagnostic code is set in step 850. Next, an indicator light for the operator of the vehicle is lit in step 900 and the routine exits.

Thus, according to the present invention, by adding a control valve to seal off the fuel tank during canister purge to the engine, it is possible to eliminate rich or lean fuel spikes form the tank, thus reducing possibility of stalling and improving emissions. In addition, canister durability is improved by allowing storing and purging of fuel vapors in two different directions.

This concludes the description of the invention. The reading of it by those skilled in the art would bring to mind many, alterations and modifications without departing from the spirit and the scope of the invention. Accordingly, it is intended that the scope of the invention be defined by the following claims:

What is claimed is:

1. A system for controlling fuel vapor purging in a vehicle, comprising:
   an internal combustion engine;
   a fuel tank;
   a fuel vapor storage device; and
   a valve assembly routing fuel vapors in a first direction only from said fuel tank to said fuel vapor storage device and for routing fuel vapors in a second direction opposite said first direction into said engine only from said fuel vapor storage device.

2. The system recited in claim 1 wherein said fuel vapor storage device is a carbon canister.

3. The system recited in claim 1 wherein said internal combustion engine is a direct injection spark ignition (DISI) engine.

4. The system recited in claim 1 further comprising an electric motor coupled to said internal combustion engine.

5. The system recited in claim 1 wherein said valve assembly comprises a first valve for controlling fuel vapor flow into said engine, and a second valve for controlling fuel vapor flow from said fuel tank.

6. The system recited in claim 5 further comprising a controller for controlling said valve assembly to enable fuel vapor storage into said fuel vapor storage device and to enable fuel vapor purging into said internal combustion engine from said fuel vapor storage device only.

7. The system recited in claim 6 wherein said controller closes said first valve and opens said second valve to enable fuel vapor flow form said fuel tank into said fuel vapor storage device only.

8. The system recited in claim 6 wherein said controller opens said first valve and closes said second valve to enable fuel vapor purging into said internal combustion engine only from said fuel vapor storage device.

9. The system recited in claim 7 wherein said controller enables fuel vapor storage into said fuel vapor storage device based on an operating condition.

10. The system recited in claim 9 wherein said operating condition is an internal pressure of said fuel tank.

11. A method for controlling fuel vapor purging in a vehicle having an internal combustion engine coupled to a fuel tank, a fuel vapor storage device, and a valve assembly, the method comprising:

providing a first mode of operation wherein fuel vapors are routed from the fuel tank to the fuel vapor storage device only in a first direction; and providing a second mode of operation wherein fuel vapors are routed from the fuel vapor storage device only to the internal combustion engine in a second direction opposite said first direction.

12. The method recited in claim 11 wherein the fuel vapor storage device is a carbon canister.

13. The method recited in claim 11 wherein the valve assembly further comprises a first valve for controlling fuel vapor flow into said engine, and a second valve for controlling fuel vapor flow from the fuel tank.

14. The method recited in claim 13 wherein fuel vapor routing in said first direction comprises closing said first valve and opening said second valve.

15. The method recited in claim 13 wherein fuel vapor routing in said second direction comprises opening said first valve and closing said second valve.

16. The method recited in claim 14 wherein providing said first mode of operation is based on an operating condition.

17. The method recited in claim 16 wherein said operating condition is an internal pressure of the fuel tank.

18. The method recited in claim 16 wherein said step of providing said first mode of operation is performed when an internal pressure of the fuel tank exceeds a preselected value.

19. The method recited in claim 16 wherein said step of providing said second mode of operation is performed based on an operating condition.

20. The method recited in claim 19 wherein said operating condition is an end of the engine adaptive learning cycle.

21. The method recited in claim 19 wherein said operating condition is ambient temperature.

22. The method recited in claim 19 wherein said operating condition is barometric pressure.

23. A system for controlling fuel vapor purging from a fuel tank and a fuel vapor storage device into an internal combustion engine, the system comprising:

a purge control valve coupled between the fuel vapor storage device and the engine;

a fuel tank control valve coupled between the fuel tank and the engine; and a controller for closing said purge control valve and opening said fuel tank control valve to route a fuel vapor from the fuel tank to a fuel vapor storage device only and for closing said fuel tank valve and opening said purge control valve to route said fuel vapor from said fuel vapor storage device to the engine only.

24. The system recited in claim 23 wherein said controller opens said fuel tank control valve and closes said purge control valve when an internal pressure of the fuel tank exceeds a predetermined value.

25. The system recited in claim 23 wherein said controller closes said fuel tank control valve and opens said purge control valve based on an operating condition.

26. The system recited in claim 23 wherein said engine operating condition is an end of an engine adaptive learning cycle.

27. The system recited in claim 25 wherein said engine operating condition is an ambient temperature.

28. The system recited in claim 25 wherein said engine operating condition is a barometric pressure.

29. The system recited in claim 23 wherein said fuel vapor storage device is a carbon canister.

30. A system for controlling fuel vapor purging comprising:

an internal combustion engine;

a fuel tank;

a fuel vapor storage device;

a passageway connecting said engine, fuel tank, and fuel vapor storage device in a three-way connection;

a purge control valve coupled between said connection and said engine via said passageway;

a fuel tank control valve coupled between said connection and said fuel tank via said passageway; and a controller for selectively opening and closing said fuel tank control valve and said purge control valve.

31. The system recited in claim 30 wherein said fuel vapor storage device is a carbon canister.

32. The system recited in claim 30 wherein said controller opens said fuel tank control valve and closes said purge control valve to enable a fuel vapor storage into said fuel vapor storage device based on an operating condition.

33. The system recited in claim 32 wherein said operating condition is an internal pressure of said fuel tank.

34. The system recited in claim 30 wherein said controller closes said fuel tank control valve and opens said purge control valve to enable fuel vapor purging into said engine from said fuel vapor storage device only.

35. The system recited in claim 30 wherein said internal combustion engine is a direct injection spark ignition (DISI) engine.

36. The system recited in claim 30 further comprising an electric motor coupled to said internal combustion engine.

37. A method for controlling fuel vapor purge in a vehicle having an internal combustion engine coupled to a fuel tank, a fuel vapor storage device, a fuel tank control valve and a purge control valve, comprising the steps of:

providing a first indication when an internal pressure of the fuel tank is greater than a predetermined value;

in response to said first indication, opening the fuel tank control valve and closing the purge control valve to allow fuel vapor flow from the fuel tank into the fuel vapor storage device in a first direction;

providing a second indication when the fuel vapor storage device is ready to be purged based on an operating condition; and in response to said second indication, closing the fuel tank control valve and opening the purge control valve to allow fuel vapor flow from the fuel vapor storage device only into the internal combustion engine in a second direction opposite said first direction.

38. The method recited in claim 37 wherein said operating condition comprises an end of an engine adaptive learning cycle.

39. The method recited in claim 37 wherein said internal combustion engine is a direct injection spark ignition (DISI) engine.

40. The method recited in claim 37 wherein the internal combustion engine is coupled to an electric motor.

41. The method recited in claim 37 further comprising estimating a fuel fraction coming from the fuel vapor storage device into the engine based on an operating condition when the fuel tank is isolated from the engine.

42. The method recited in claim 41 wherein said operating condition is a barometric pressure.

43. The method recited in claim 41 wherein said operating condition is a time since last fuel vapor purge.

44. The method recited in claim 41 wherein said operating condition is ambient temperature.

45. The method recited in claim 41 wherein the fuel tank is isolated from the engine when said fuel tank control valve is closed.

\* \* \* \* \*